United States Patent Office 3,254,090
Patented May 31, 1966

3,254,090
QUATERNARY MONO-UNSATURATED PYRIDINIUM SALTS
Karl Kuffner, Munich, Germany, assignor, by mesne assignments, to Agfa Aktiengesellschaft, Leverkusen, Germany
No Drawing. Original application Apr. 21, 1960, Ser. No. 23,639. Divided and this application June 26, 1963, Ser. No. 299,133
2 Claims. (Cl. 260—290)

The present invention generally relates to novel compounds useful in the production of cyanine dyes. More particularly, this invention pertains to new quaternary 2-methyl-tetrahydropyridine compounds which are useful for preparing cyanine dye compounds which are in turn especially useful for the sensitization of photographic emulsions.

This application is a division of application Serial No. 23,639, filed April 21, 1960, now abandoned.

BACKGROUND

Most of the well known methods for producing cyanine compounds utilize as a starting material five membered-heterocyclic N-containing tertiary bases which have a methyl group joined to the ring C-atom which is adjacent to the ring nitrogen atom. These starting compounds can be represented by the general formula:

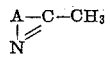

wherein A represents the atoms which are necessary to complete the heterocyclic ring, N is a nitrogen atom in the heterocyclic ring and C is the carbon atom in the heterocyclic ring which is joined to the nitrogen atom by a double bond.

By way of example, such tertiary bases would include 2-methyl-thiazoline, 2-methyl-thiazole, 2-methyl benzothiazole, and the corresponding oxazole and selenazole, 2-methyl pyrroline, quinaldine, etc.

These tertiary base starting materials are then usually quaternized by reaction with, for example, ethyl iodide or dimethyl sulfate. The resulting quaternary cyclo-ammonium salts are then usually converted into cyanine compounds in a number of known ways; for example, by reaction with orthoesters, or by conversion with mercapto compounds or by conversion with diphenyl formamidine to intermediates which in turn form carbocyanines with the same or another quaternary salt.

THE INVENTION BROADLY

It has now been found that cyanine dyes of unusual properties can be synthesized by starting with either 2-methyl-1,4,5,6-tetrahydropyridine having the formula:

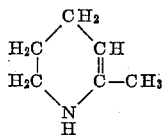

or with 2-methyl-3,4,5,6-tetrahydropyridine having the formula:

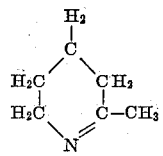

This invention also includes the use of lower alkyl homologs of the above compounds which have alkyl groups in the 3, 4, 5 and/or 6 positions.

So far as is known, the above compounds have never been used as starting materials for the preparation of cyanine dyes.

In accordance with this invention it has been found that the above compounds can be converted to a quaternary salt represented having the following general formula:

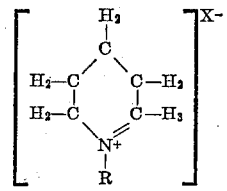

wherein R represents a lower alkyl radical such as methyl, ethyl, propyl, butyl, isobutyl, amyl, hexyl, heptyl, etc., and X represents an anion group such as F, Br, Cl or I. Ethyl is the preferred R grouping and I is the preferred X grouping.

The quaternary salts represented by the above formula can be utilized to produce cyanine dyes in exactly the same way that those skilled in the dye making art have heretofore converted other but different types of quaternary salts to cyanine dyes. Since such techniques are generally known, they will not be repeated in detail here. The essential novelty of the present invention is the discovery that the above quaternary salts can be used in this way to produce dye products having unusual and unexpected properties.

The dyes produced in accordance with this invention are suitable for the sensitization of photographic silver halide emulsions, and particularly for silver chloride and chlorobromide emulsions. These dyes have a high sensitization intensity. Another advantage is that they can be easily washed out from the photographic layers in the customary treating solutions and leave little or no color stain in the coating. This advantage makes the new dyes especially suitable for use in paper emulsions. The maximum sensitization is shifted for about 10 mu towards longer waves compared to the corresponding dyes containing the pyrroline ring.

THE EXAMPLES IN GENERAL

The following examples are illustrative of preferred embodiments of the present invention. It should be understood that these examples are not intended to limit the invention and that obvious changes may be made by those skilled in the art without changing the essential characteristics and the basic concept of the invention. The parts and percentages are by weight, the temperature is room temperature and the pressure is atmospheric, unless otherwise indicated.

Example 1

A quantity of 2-methyl-1,4,5,6-tetrahydropyridine having the formula:

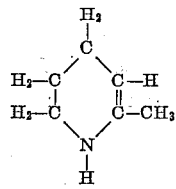

was prepared in accordance with the procedure set forth in the literature (Lipp, A. 289, 199, 1896 A.D., Gabriel, B. 42, 1242, 1909 A.D.). This preparation involved the reaction of 6-bromine hexanone-2 and ammonia. Eight grams of this material was brought together with 20 grams of ethyl iodide and 20 ml. of ethyl acetate, and the mixture heated under reaction conditions for about one hour in a water bath. The resulting salt reaction product was sucked off, washed and then dried with ethyl acetate. The yield was about 20 grams (approximately 95%) and the product had a melting point of about 240–246° C. The quaternary salt resulting from the reaction can be represented by the following formula:

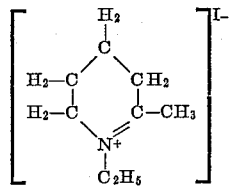

In a subsequent step, 15.2 grams of the above quaternary salt was brought together with 17.4 grams of diphenyl formamidine and 6 ml. of acetic anhydride for about 30 minutes and at a temperature of about 120° C. While still warm the foregoing melt was mixed with acetone and then chilled. The crystallized product obtained from the chilling step was sucked off, washed with acetone and dried, the yield being 9.5 grams (30%). The product, 2-beta-acetanilidovinyl)-1-ethyl-3,4,5,6-tetrahydropyridinum iodide, had a melting point of 210–211° C. and had the following structural formula:

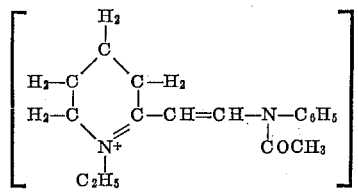

Two grams of the above acetanilido compound, 0.9 gram of N-ethyl rhodanine and 5 ml. of pyridine were boiled together for about 20 minutes. The resulting solution was poured into a small quantity of water and the precipitated dye had the following formula:

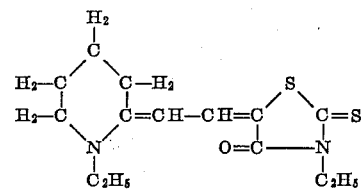

⇅

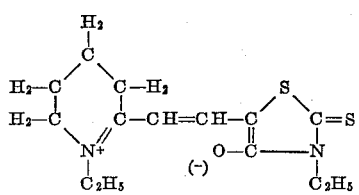

It was filtered off then dried with ethanol. The yield was 1.2 grams (80%). When the dye was recrystallized from an ethanol solution blue glittering compact crystals were obtained. It had an absorption maximum of 493 mu and sensitized a chlorobromide emulsion to 575 mu with a maximum at 540 mu.

*Example 2*

A carbocyanine of the formula:

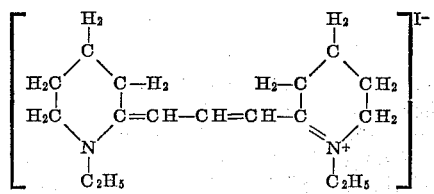

was produced by the conversion of the quaternary salt of Example 1 with orthoformic acid ester in pyridine in the conventional way known to those in the cyanine dye art. It had an absorption maximum of 457 mu and sensitized a chlorobromide emulsion to about 520 mu with a maximum of about 470 mu.

*Example 3*

A dye having the formula:

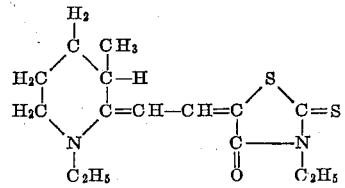

was produced by (a) starting with 2,3-dimethyl-1,4,5-6-tetrahydropyridine prepared in accordance with the disclosure of Sachs, B. 32, 62 (1899) and Lipp, Windman, A. 409, 133 (1915), (b) quaternizing with ethyl iodide in the manner taught by Example 1, (c) thereafter reacting with diphenylformamidine in the manner taught by Example 1, and (d) converted into dyes with ethyl rhodanine in the manner taught by Example 1. The absorption maximum of the product was 495 mu and the dye sensitized a chlorobromide emulsion to about 580 mu with a maximum sensitization at about 545 mu.

Those skilled in the chemical arts, and particularly in the art to which this invention pertains, will readily appreciate that many modifications of the basic invention set forth here are possible. For example, it is quite possible that other closely related compounds might work as well as the herein specifically described compounds and there would certainly be no invention involved in trying such closely related compounds, in view of the present broad disclosure. All of these modifications are considered to be within the scope of the present claims by virtue of the well-established "doctrine of equivalents."

What is claimed is:

1. As a novel composition of matter, the salt having the formula:

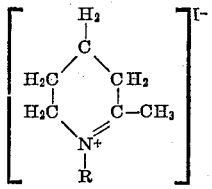

wherein R is a lower alkyl group and I is an iodine anion.

2. A compound of the formula:

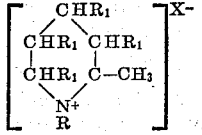

wherein each $R_1$ is selected from the group consisting of hydrogen atoms and R groups, each R is a lower alkyl group and X is a halogen atom.

References Cited by the Examiner

UNITED STATES PATENTS 2,656,388  10/1953  Schultz _____ 260—290
2,750,385   6/1956  Schmidle et al. _____ 260—290

FOREIGN PATENTS 530,124  1/1955  Belgium.
1,073,133  1/1960  Germany.

OTHER REFERENCES

Klingsberg: "Pyridine and Derivatives," Part One, Interscience Pub., Inc. (1960), pages 83–91.

IRVING MARCUS, *Primary Examiner.*

JOHN D. RANDOLPH, *Examiner.*